(12) United States Patent
Gurevich et al.

(10) Patent No.: US 7,106,529 B2
(45) Date of Patent: Sep. 12, 2006

(54) FLAT WIDE-ANGLE LENS SYSTEM

(75) Inventors: Igor Gurevich, Saarbrucken (DE); Victor Faybishenko, San Carlos, CA (US); Leonid Velikov, San Carlos, CA (US)

(73) Assignee: Microalign Technologies, Inc., San Carlos, CA (US)

( * ) Notice: Subject to any disclaimer, the term of this patent is extended or adjusted under 35 U.S.C. 154(b) by 0 days.

(21) Appl. No.: 10/862,178

(22) Filed: Aug. 24, 2004

(65) Prior Publication Data

US 2006/0050398 A1    Mar. 9, 2006

(51) Int. Cl.
*G02B 13/04*    (2006.01)
*G02B 27/10*    (2006.01)

(52) U.S. Cl. ........................ 359/749; 359/622

(58) Field of Classification Search ................ 359/749, 359/752, 740, 744, 713, 619, 621–623, 628
See application file for complete search history.

(56) References Cited

U.S. PATENT DOCUMENTS

| | | | |
|---|---|---|---|
| 4,188,092 A | 2/1980 | Momiyama | |
| 5,790,324 A | 8/1998 | Park | |
| 6,016,185 A | 1/2000 | Cullman et al. | |
| 6,084,719 A | 7/2000 | Sugawara et al. | |
| 6,400,510 B1 * | 6/2002 | Chen | 359/621 |
| 6,545,824 B1 | 4/2003 | Sensui | |
| 6,721,101 B1 | 4/2004 | Daniell | |
| 2002/0021497 A1 * | 2/2002 | McCulloch et al. | 359/619 |

* cited by examiner

*Primary Examiner*—Alicia M Harrington

(57) ABSTRACT

A flat wide-angle lens system of the invention has a reduced axial length and is intended for creating images with extremely wide angle of observation. The system consists of the first component which is intended for reduction of the field angle of light incidence onto the objective and comprises an assembly of at least two microlens arrays with the same pitch between the adjacent microlenses and arranged with respect to each other so as to provide afocality, and a second component that comprises an assembly of conventional spherical or aspherical microlenses that create an image on an image receiver. Each two coaxial microlenses of the microlens arrays of the first component form an inverted microtelescope of Galileo. The outlet aperture of a single microtelescope is made so that spherical aberration can be minimized almost to 0, while field aberrations can be corrected by design parameters of the microlenses.

27 Claims, 7 Drawing Sheets

FLAT WIDE-ANGLE LENS SYSTEM

FIELD OF THE INVENTION

The present invention relates to the field of optics and, more particularly, to a wide-angle flat photographic and projection lens system. More specifically, the invention relates to a wide-angle flat photographic and projection lens system which is built on an entirely new principle of combining a group or groups of flat microlenses with a group or groups of conventional optical lenses. The lens system of the invention may find application in photographic cameras, image projection systems, etc.

BACKGROUND OF THE INVENTION

For better understanding the terminology used in the present description and principles of structure of optical systems in general, it would be advantageous to make some short introduction into the field of optical objectives.

An objective is an optical system or a part thereof that faces an object of observation or photographing and that creates a real image of the object turned 180° with respect to the object. Depending on the types of optical elements, objectives can be divided into lens-types, mirror-types, mirror-lens-types, and kinoform-type objectives. Most popular are lens-type objectives that are capable of acquiring various characteristics due to increase in the number of component lenses.

Photographic objectives or similar objectives of motion-picture cameras, TV cameras, night-vision instruments, and objectives used in television generally create reduced images of remote objects on a layer of a photosensitive material or on photoreceivers, e.g., TV picture tubes, matrices or linear photoreceivers, or photocathodes of optoelectronic devices. The scale of an image is proportional to a focal distance f' of the objective, while illumination intensity is inversely proportional to a second power of a diaphragm number K, which is an f'/D ratio where D is a diaphragm of an inlet pupil of the objective. A value of 1/K is known as an aperture ratio. The limit value of the diaphragm number that allows correction of aberrations is K=0.5. A majority of existing objectives have K within the range of $3 > K \geq 1.2$. Photographic resolution capacity $N_f$ of photo and motion-picture objectives depends on aberrations, as well as on resolution capacity Nc of the photosensitive layer of the reproducing medium and can be calculated with the use of the following approximated formula: $1/N_f = 1/N_0 + 1/N_c$, wherein $N_0$ is a visual resolution capacity of the objective. In a lens system, aberration is an error resulting from a failure of light rays from one point to converge to a single focus. A part of a space or surface the points of which are reproduced by the objective with a required quality is characterized by an angular field, i.e., a flat angle 2ω that corresponds to a solid angle that is coaxial with the optical axis and has the apex in the center of the inlet pupil of the objective. Angular field of modern photo cameras is normally within the range of 40° to 70°, while in aerophoto cameras this angle may reach 140°.

A special group is pancreatic objectives which are also known as zoom lenses, the focal distance of which can be smoothly adjusted in a wide range by displacing separate lenses or groups of lenses along their optical axis. The number of lenses in such objectives may be as high as 30 or more. Such objectives are used, e.g., in transmission TV cameras, video cameras, and photo cameras. A ratio between the maximal and minimal focus distances may reach 40, or more. For decrease of optical losses, modern objectives are provided with anti-reflective coatings.

Normally, conventional wide-angle photographic objectives or lens systems have big dimensions, i.e., a lengthy objective, and therefore are inconvenient for use and storage. Another characteristic feature of a wide-angle photographic lens system is an increased diameter. This not only increases the overall radius and hence the dimensions of the lens system but also significantly increases the weight of the objective as a whole.

There exist a large number of wide-angle photographic lens systems of different types, e.g., conventional photographic lens systems for photocameras, image projecting lens systems, wide-field lithography systems, etc.

For example, U.S. Pat. No. 4,188,092 issued in 1980 to Kikuo Momiyama describes a retrofocus type lens for a photocamera having an angle of view at least 75° and F number 1:2.0. The lens includes a first lens group of a divergent type, a second lens group of a convergent type, and a third lens group of a convergent type. The first lens group includes in the order stated a positive meniscus lens, a negative meniscus lens, a positive meniscus lens, and a negative meniscus lens. The second lens group includes a positive lens, which is either a single lens or consists of a positive lens, and a negative lens cemented to each other and with a front convex face directed toward an object to be photographed. The third lens group includes a positive lens having a rear convex face directed toward an image of the object, a biconcave lens with its front surface radius smaller than its rear surface radius, a positive meniscus lens with a convex surface facing the image, and a positive lens. The biconcave lens and the positive meniscus lens are respectively replaceable with cemented doublet lenses. The lens system is characterized in that the first lens group includes meniscus lenses arranged in the order of positive, negative, positive and negative lenses, and particularly in that the third positive meniscus lens serves effectively to correct chromatic distortion aberration and chromatic coma aberration.

Another example, e.g., U.S. Pat. No. 6,084,719 issued in 2000 to Saburo Saguwara, et al. discloses a projection optical system that includes a first lens unit in which negative lenses included therein are larger in number than positive lenses included therein, and a second lens unit in which positive lenses included therein are larger in number than negative lenses included therein. In this projection system, design parameters are determined such that an off-axial principal ray intersects an optical axis at a point between the first lens unit and the second lens unit, and telecentricity is made on the second conjugate point side. The second lens unit includes a negative lens of meniscus form convex toward the second conjugate point side and a positive lens whose both surfaces are convex.

A common problem associated with wide-angle lens systems of the types described above as well as with other conventional wide-angle lens systems is that an increase in the aperture ratio of the lens system, widening of the field of observation, and improvement in resolution capacity of the optical system require an increase in the lens diameter. However, such an increase leads to more noticeable aberrations, and in order to solve the aberration problem, it is necessary to introduce into the system new optical elements. However, Increasing the number of lens elements to overcome the above-described drawbacks degrades the performance of the lens system due to adverse effects such as flare. All this significantly increases the manufacturing cost and the cost of the products.

Attempts have been made, however, to solve the above problems and to improve conventional wide-angle lens systems, e.g., by increasing the amount of optical elements.

For example, U.S. Pat. No. 5,790,324 issued in 1998 to Cheon-Ho Park describes a wide-angle photographic lens system in which improvement in optical characteristics is achieved at the expense of complexity, increased weight, and increased cost. More specifically, the aforementioned lens system consists of seven lens elements, including combined lens elements.

One of the latest patents in this field, i.e., U.S. Pat. No. 6,545,824 issued in 2003 to Sensui Takayuki, discloses a significantly improved lens optical system, in which the number of lens elements is reduced to five along with a twice shorter length of the system as a whole. Nevertheless, while preserving the traditional structure, the lens optical system of U.S. Pat. No. 6,545,82 still remains large in size, heavy in weight, and complicated in structure. These problems will always remain until a wide-angle lens system is designed on traditional principles of a wide-lens system architecture.

Development of optical fiber systems, light-emitting diodes and laser diodes, systems of management, control, and conversion of light beams in optical communication systems, etc. gave impetus to developing new and efficient microoptical systems such as microlenses, microobjectives, collimators, etc. In principle of their operation and structure, the aforementioned optical elements are the same as respective traditional optical lenses, objective, collimators, etc., but are intended for working with optical beams of small diameters, e.g., from several tens of microns to several millimeters. Miniaturization of optical elements to the level of current microlenses led to very stringent requirements with regard to manufacturing accuracy and narrowed the allowable tolerances, e.g., on optical surfaces, to nanometric level. Recent success in this technology made it possible to produce microoptical lenses with very accurate aspherical surfaces.

One of the fields in which microoptics may find application is photolithography. For example, U.S. Pat. No. 6,016,185 issued to Elmar Cullman, et al. discloses an apparatus and method for photolithographic exposure of a substrate including an illumination source for providing light for producing an image on the substrate, a mask including a pattern for projection onto the substrate, a microlens assembly for projecting the light through a plurality of microlens channels onto the substrate and an actuator for moving the microlens assembly in a plane parallel to the mask and the substrate for suppressing interference effects. The above system is intended for fixed-scale (1:1) projection of an object onto an image plane. In other words, the microlenses of this system are assembled into an array that forms an objective for parallel transfer of an image without any reduction or magnification of the image.

A series of inventions made by Stephen Daniell (see, e.g., U.S. Pat. No. 6,721,101 issued in 2004) relates to the use of a microlens optical system for obtaining a 3—D image in the observer's sight. This technique is based on the principle of creation of parallax between the "left" and "right" images, which is perceived by the observer as a stereo effect.

The arrays used in the above inventions can be divided into two categories. The arrays of the first type uses air as a low-index material. Such arrays may be used, for example, in illuminated displays of electronic image detection, machine vision, and real-time 3D video capture. Arrays of the second use a fluoropolymer as a low-index material, and convey a great preponderance all incident light to the image plane.

More specifically, the system of U.S. Pat. No. 6,721,101 (as well as the systems of all other inventions of Stephen Daniell) is an assembly of two array substrates, which in an overlapped state possess better optical characteristics than a single array substrate. From the optical point of view, this system functions as follows: an object located at a finite distance from the observer is converted by the overlapped arrays into an infinitely located image which is observed with the maximum possible angle of observation. This allows the observer, who is located on the symmetry axis of a display, to clearly see on this display two independent images of one object with the left and the right eyes.

In reality, the Daniell's system does not widen the angle of observation for the observer but rather creates a virtual effect of stereo vision. In this system, the second and third surfaces of the array work as a separator of angles of incidence of light, i.e., starting from angle that exceeds a predetermined value, the light does not pass through the system but is reflected on the principle of total inner reflection, e.g., to the right eye, while the light incident at smaller angles passes through the system, is focused on the last flat plane of the lens system, and returns to the left eye.

Although the Daniell's system cannot be used for widening a real angle of observation and merely redistributes and divides the optical path of light that passes through the system for stereo effect, this system is a good example of a two-array assembly for optical purposes. The use of a sandwich composed of two overlapped film-like or plate-like arrays makes it possible to significantly reduce the geometrical dimensions of the lens system.

OBJECTS AND SUMMARY OF THE INVENTION

It is an object of the invention to provide a wide-angle lens system composed of a combination of a microlens array package with a traditional lens that makes it possible to significantly reduce overall dimensions of the lens system, reduce the weight of the lens system, suppress aberration, and create a compact flat high-performance objective with a wide range of applications, e.g., for creation of photo images. Another object is to provide such a system of micro arrays that can be used in conjunction with conventional lens systems and can convert such system into compact wide-angle objectives without introduction of additional optical aberration effects.

A flat wide-angle lens system of the invention is intended for creating images with extremely wide angle of observation. The wide-angle lens system consists of two main components. The first component comprises an assembly of at least two microlens arrays with the same pitch between the adjacent microlenses and arranged with respect to each other so as to provide afocality. The first component is intended for reduction of the field angle of light incidence onto the objective, while the second component comprises an assembly of conventional spherical or aspherical microlenses that create an image on an image receiver. The aforementioned first component comprises an array of inverted microtelescopes of Galileo or microtelescopes of Kepler with multiplication equal to or different from 1. The outlet aperture of a single unit telescopic cell is made so that spherical aberration can be minimized almost to 0, while field aberrations can be corrected by design parameters of the microlenses. The focal distance of microlenses on the inlet side is shorter than the focal distance of microlenses on the outlet side. A ratio of their focuses ($V=F'2/F'1=\tan W_0/\tan W_1$) determines the value of a field angle incident on the second component of the objective. The use of such an array of microtelescopes makes it possible to significantly reduce the overall dimensions of the first component of the lens system since the longitudinal dimension of a unit telescopic cell of the array is much smaller than the longitudinal dimension of a conventional lens component used for the same function.

DETAILED DESCRIPTION OF THE INVENTION

Figure 1A:
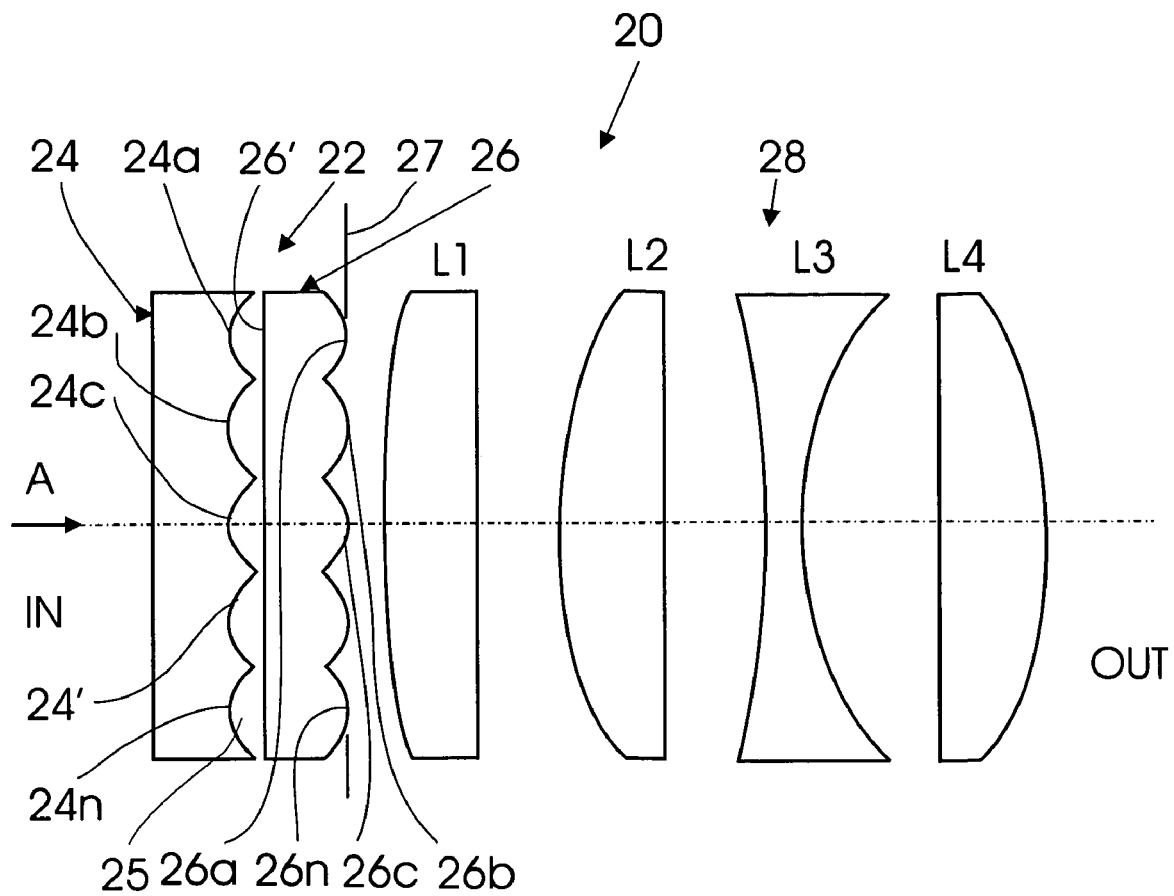
FIG. 1A is a general longitudinal sectional view of a wide-angle lens system made in accordance with one embodiment of the invention.
Figure 1B:
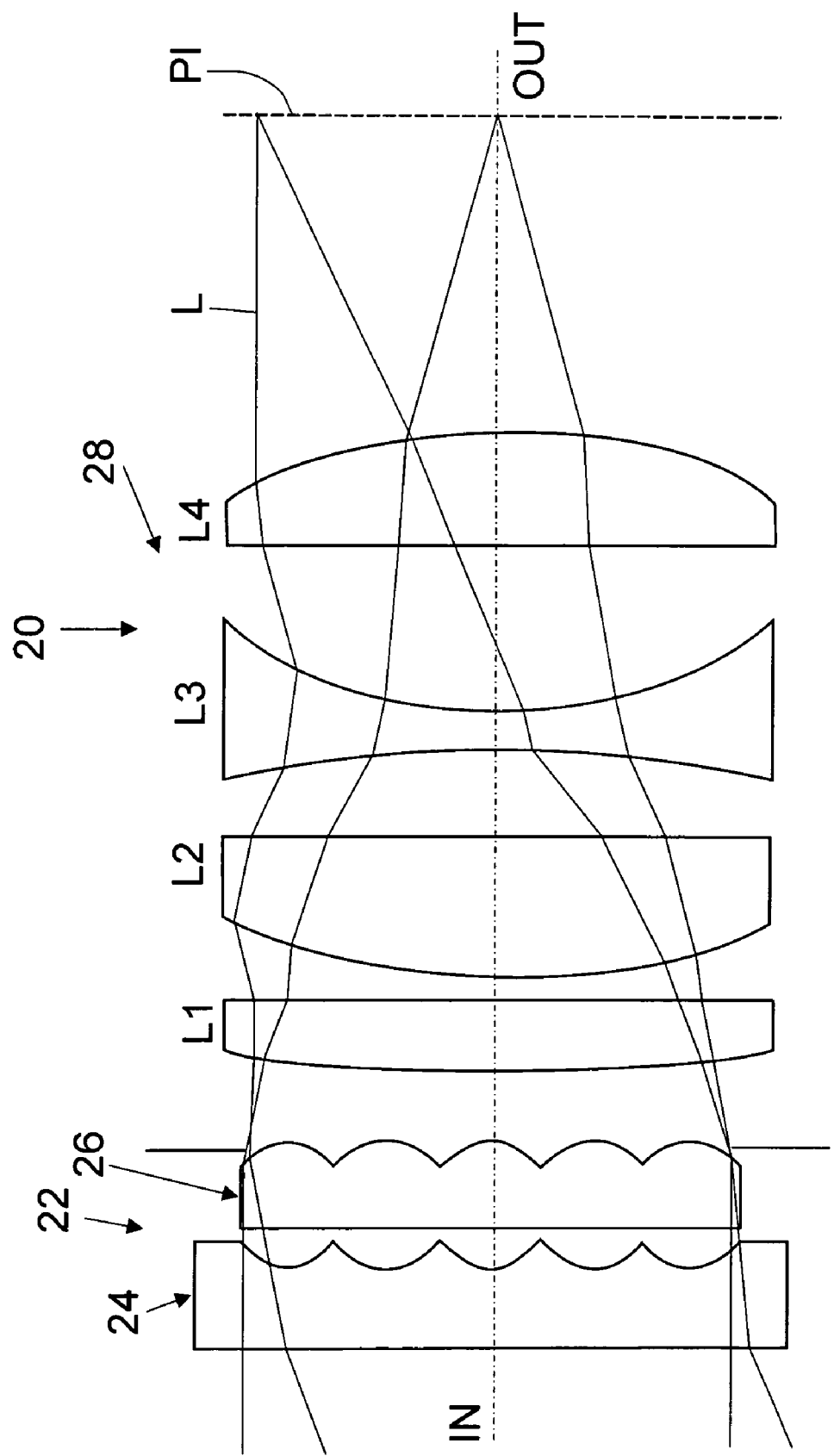
FIG. 1B is a view that shows optical ray traces for the system of FIG. 1A.
Figure 2A:
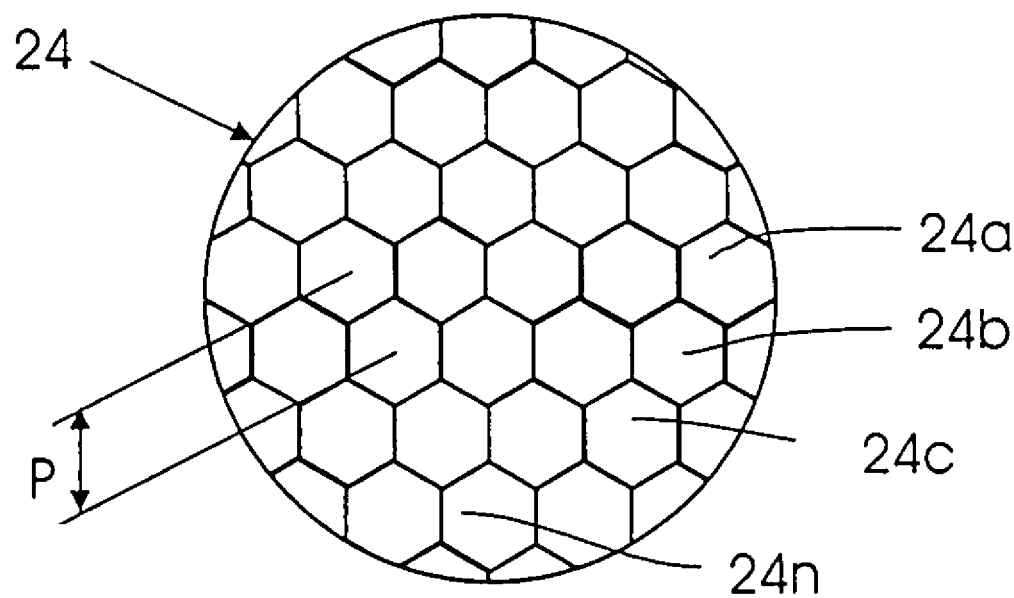
FIG. 2A is a view in the direction of arrow A in FIG. 1A that shows hexagonal arrangement of microlenses packing.
Figure 2B:
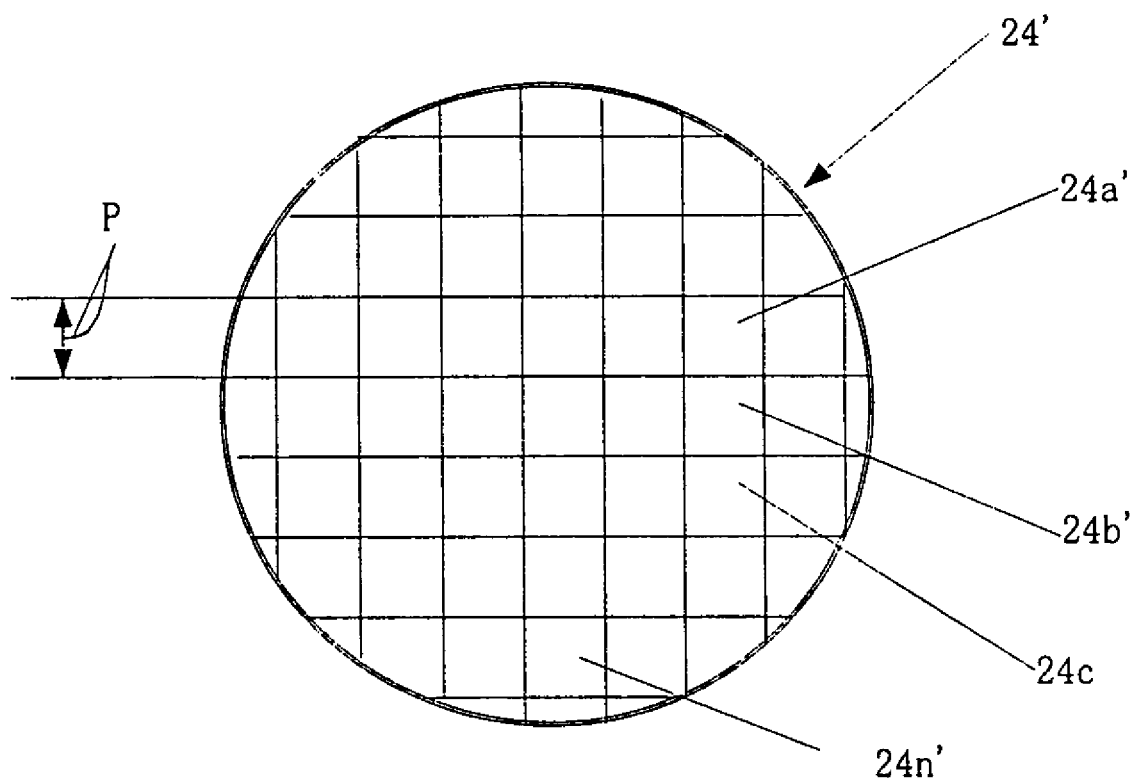
FIG. 2B is a view in the direction of arrow A in FIG. 1A that shows orthogonal arrangement of microlenses packing.

A general longitudinal sectional view of a wide-angle lens system made in accordance with one embodiment of the invention is shown in FIG. 1A. The optical ray traces for the system of FIG. 1A are shown in FIG. 1B. It can be seen that the system, which in general is designated by reference numeral 20, consists of two main components, one of which is an assembly 22 of at least two microlenses arrays 24 and 26 with the same pitch P between the adjacent microlenses 24a, 24b, 24c, . . . 24n of the array 24 and between the adjacent microlenses 26a, 26b, 26c, . . . 26n of the array 26. The respective microlenses of both arrays 24 and 26, i.e., microlenses 24a and 26a, 24b and 26b, etc., are axially aligned. The arrangement of microlenses in the microlens array 24, when viewed in the direction of an optical axis indicated by arrow A, is shown in FIGS. 2A and 2B, where FIG. 2A shows hexagonal arrangement and FIG. 2B shows orthogonal arrangement. It is understood that since the microlenses of both arrays are coaxial, the microlenses of the array 26 will have the same arrangement as those shown in FIGS. 2A and 2B. In the embodiment of FIG. 2A, the microlenses 24a, 24b, 24c, . . . 24n have a hexagonal arrangement. Reference numeral 28 designates a conventional lens or a conventional-lens system that is combined with the assembly 22 to accomplish the system 20, e.g., in the form a wide-angle objective for use in conjunction with a photo camera (not shown).

In FIG. 1A, reference numeral 27 designates an aperture diaphragm located between the components 22 and 28, and reference numeral 25 designates air spaces between the back flat side 26'of the microlens array 26 and the curvilinear surface 24' of the microlens array 24. In FIG. 1B, symbol P1 designates an image plane.

In the context of the present invention, the term "microlens" covers a single microlens in each of the microlens arrays 24 and 26. The term "lens" covers a conventional optical lens, while the term "lens system" designates an assembly of microlenses with the conventional optical lenses and may be equivalent to the word "objective", e.g., a wide-angle photo objective.

Figure 3:
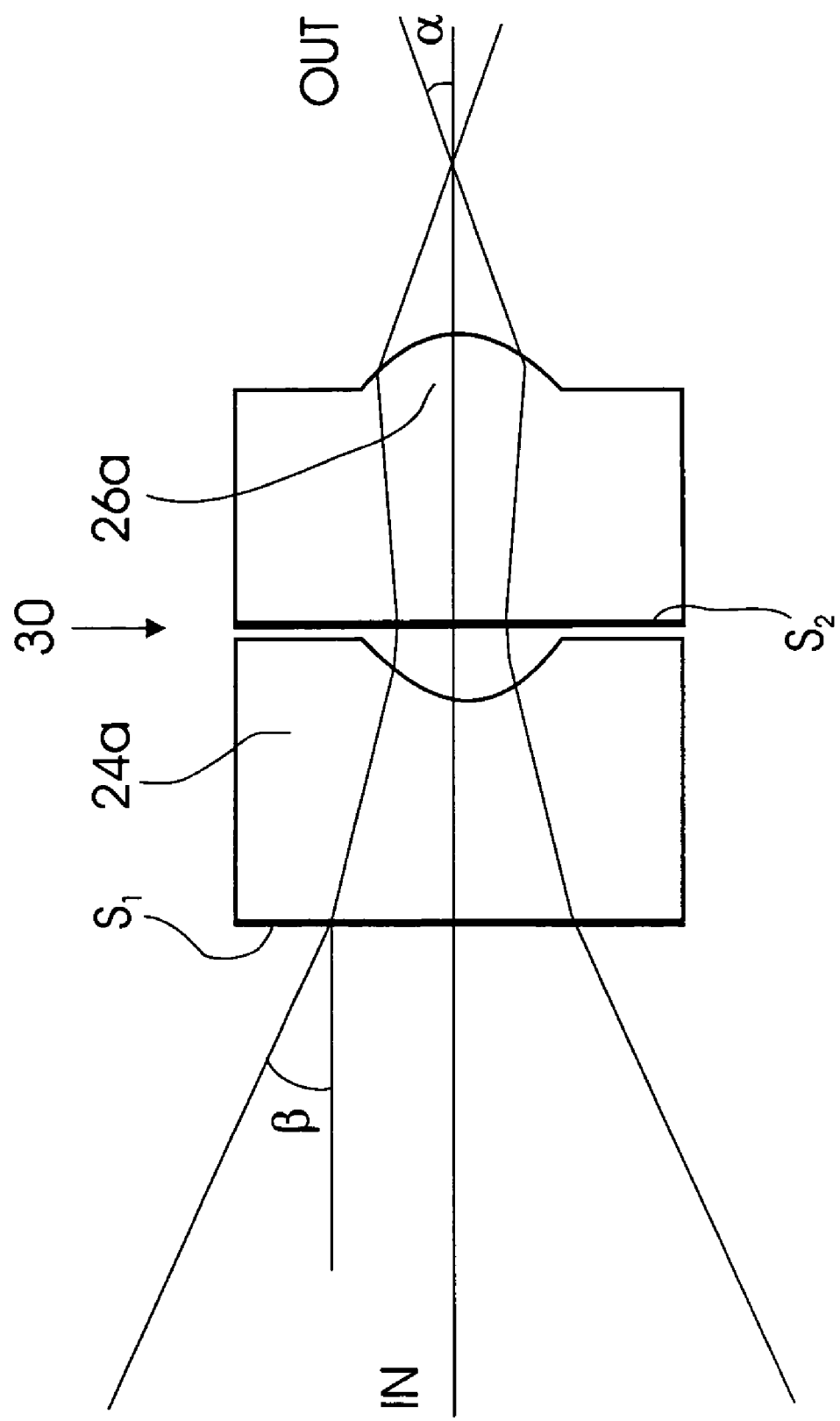
FIG. 3 is a longitudinal sectional view of a unit microlens cell.

In order to understand the principle of the construction and operation of the wide-angle lens system 20 of the invention, it would be advisable first to consider a unit microlens cell of the array assembly 22. It is understood that the array assembly 22 contains a plurality of such unit microlens cells. One such unit microlens cell 30 is shown in FIG. 3, which is a longitudinal sectional view of the cell 30. The cell 30 consists of a first microlens, such as the microlens 24a (FIGS. 1 and 2) that may be spherical or aspherical and a second microlens, such as the microlens 26a (FIGS. 1A and 2). The unit cell 30 composed of the aforementioned microlenses 24a and 26a comprises an inverted microtelescope of Galileo or microtelescope of Kepler with multiplication equal to or different from 1. For example, in the case of the microtelescope of Galileo, the microlens 24a is negative, i.e., it has a concave optical surface, while the microlens 26a is made positive, i.e., it has a convex optical surface.

By choosing an appropriate outlet aperture of the microtelescopic cell 30, it would be possible to eliminate or to minimize spherical aberrations, while field aberrations can be corrected by design parameters of the microlenses. The following formula was used for calculating parameters of microlenses of the array assembly 22 in order to minimize the field aberration:

$$Z = \frac{C(r)^2}{1 + (\sqrt{1-(1+k)c^2r^2}}$$

where Z is a sag, r is a radial coordinate, c is a curvature of the surface, and k is a conic constant.

The focal distance of the microlens 24a, which is located on the inlet side (IN in FIG. 3) of the cell 30, is shorter than the focal distance of microlenses 26a on the outlet side (OUT in FIG. 3). A ratio of their focuses (V=F'2/F'1=tan $W_0$/tan $W_i$) determines the value of a field angle α incident on the second component of the objective. The use of such an array of microtelescopes makes it possible to significantly reduce the overall dimensions of the first component 22 of the lens system, i.e., the assembly of the microlens arrays 24 and 26, since the longitudinal dimension of each unit telescopic cell 30, which corresponds to the thickness of the first component 22, is many times smaller than the longitudinal dimension of a conventional lens component that could be used for the same function.

In order to reduce optical losses, the microlenses 24a, 24b, 24c, . . . 24n of the microlens array 24 and the microlenses 26a, 26b, 26c, . . . 26n of the microlens array 26 are packed into a hexagonal or orthogonal lattice arrangements so that the peripheral configurations of each microlens have a hexagonal shape or square shape. This is shown in FIGS. 2A and 2B. In FIG. 2B the respective microlens array 24'is shown with microlenses designated as 24a', 24b', 24c'. . . 24n '.

As can be seen from FIG. 3, the microlens cell 30 transforms a field angle β of light incident on the input side of the microlens cell for into an about twice smaller angle α on the output side. For example, a field angle β of 70° on the input side can be transformed into angle α of 35° on the output side. As a result, the angle field on the output side will be respectively reduced. The aforementioned numbers of angle were given only as examples, and by changing the design parameters of the microlenses and arrays, it would be possible to provide much greater angle ratios.

The microlenses may have dimensions from several tens of microns to several millimeters and may have a sag from several tens of microns to fractions of millimeters and greater. The microlenses can be made from various optical materials such as optical glasses, quartz, or plastics. The arrays can be produced in the form of a continuous sheets or strips and cut out to a required configuration. In such sheets or strips, the microlenses can be formed by means of photolithography, casting, mechanical cutting, etching, etc. Nowadays, these techniques are well developed, and microlens arrays of some types are commercially available. The microlens array assembly 22, i.e., the first component of the system 20, may have a thickness, e.g., within the range of 1 mm to several millimeters. The front surfaces of the microlenses may be coated with anti-reflective coatings such as coating films S1 and S2 shown in FIG. 3.

As has been mentioned above, the second component 28 (FIG. 1A) of the wide-angle lens system 20 may comprises a conventional optical lens or a system of conventional lenses. One such conventional lens system that consists of four conventional lenses L1, L2, L3, and L4 is shown in the embodiment of the wide-angle lens system of the invention shown in FIG. 1A. The second component 28 of the type shown in FIG. 1A will have an optical power which is twice lower than the optical powder of the entire wide-angle lens system 20.

In the embodiment shown in FIGS. 1A–3, the second component 28 consists of four spherical lenses, the first one L1 of which is a substantially flat lens, the second lens and the fourth lenses L2, L4 are double-convex lenses, while the third lens L3 is a double-concave lens.

An example of parameters and dimensions for a specific wide-angle lens system of the invention made in the form of a wide-angle objective and shown in FIGS. 1A, 1B, 2, and 3 is given in Table 1.

TABLE 1

| N | Radii (mm) | Thickness (mm) | Clear Aperture (mm) | Refractive Index | Dispersion |
|---|---|---|---|---|---|
| 1 | 0.0000 | 0.250 | 3.00 | 1.806 | 40.9 |
| 2r | 0.3860* | 0.150 | 2.80 | | |
| 3 | 0.0000 | 0.500 | 2.80 | 1.516 | 64.1 |
| 4r | −0.4984* | 0.200 | 2.76 | | |
| 5 | 4.0701 | 1.114 | 2.76 | 1.617 | 55.1 |
| 6 | 47.0116 | 0.107 | 2.80 | | |
| 7 | 5.8285 | 0.750 | 3.00 | 1.611 | 57.2 |
| 8 | 0.0000 | 0.564 | 2.94 | | |
| 9 | −54.3379 | 0.400 | 2.92 | 1.6725 | 32.3 |
| 10 | 1.5910 | 0.550 | 2.42 | | |
| 11 | 15.6375 | 1.084 | 2.52 | 1.611 | 57.2 |
| 12 | −1.8826 | 0.000 | 2.76 | | |

*) designates a rotation symmetry aspheric surface;
r) designates the array, where on the surface 2r the value of K was equal to 0.474. the value of K on the surface 4r was equal to 0.261.
Surface 2r was formed by microcells packed in hexagonal lattice with the pitch (P) equal to 500 mkm. Similarly, Surface 4r was formed by microcells packed in hexagonal lattice with the pitch (P) also equal to 500 mkm.

The system had the following general characteristics: f'/D ratio=2.5; f'=2.58; $f_b$ (working distance)=3.1.

Figure 4A:
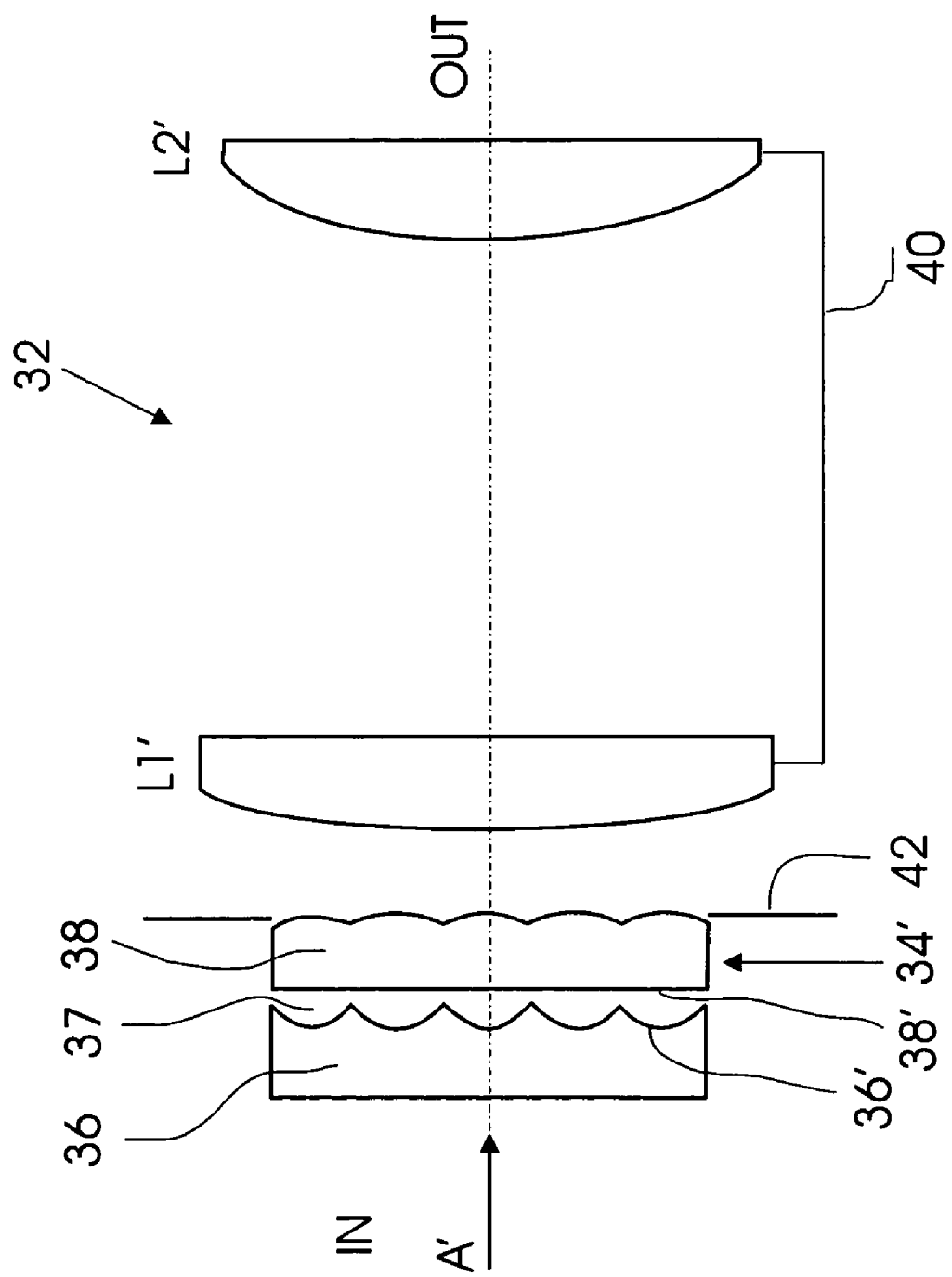
FIG. 4A is a view that illustrates a wide-angle lens system made in accordance with another embodiment of the invention.

FIG. 4A illustrates a wide-angle lens system made in accordance with another embodiment. This system, which in general is designated by reference numeral 32, consists of a first component that comprises an assembly 34 of two microlens arrays 36 and 38, a second component 40 that comprises a set of two conventional flat-convex lenses L1' and L2', and an aperture diaphragm 42 arranged between the first and second components. Structurally, the microlens array assembly 34 is similar to microlens assembly 20 of the previous embodiment but differs from it by specific parameters of individual microlenses. The pitches of the microlenses in the microlens arrays 36 and 38 are equal to each other. Asphericities of the microlenses and conventional lenses used in the system 32'of FIG. 4A were calculated by the same formulas as given above for the embodiment of FIGS. 1A–3.

An example of parameters and dimensions for a specific wide-angle lens system of the type shown in FIG. 4A with the second component 32 composed of two conventional lenses is given in Table 2.

TABLE 2

| N | Radii (mm) | Thickness (mm) | Clear Aperture (mm) | Glass |
|---|---|---|---|---|
| 1 | 0.0000 | 0.250 | 0.800 | BK7 |
| 2r | 0.2500* | 0.150 | 0.160 | |
| 3 | 0.0000 | 0.500 | 0.160 | BK7 |
| 4r | −0.4985* | 0.110 | 0.160 | |
| 5 | 3.2538* | 0.412 | 1.000 | NOA61 |
| 6 | 0.0000 | 3.091 | 1.000 | |
| 7 | 2.7687* | 0.337 | 1.300 | NOA61 |
| 8 | 0.0000 | 0.000 | 1.300 | |

With regard to microlenses:
*) designates a rotation symmetry aspheric surface;
r) designates the array, where on the surface 2r the value of K was equal to 0.02; the value of K on the surface 4r was equal to 0.60.
Surface 2r was formed by microcells packed in hexagonal lattice with the pitch (P) equal to 320 mkm. Similarly, Surface 4r was formed by microcells packed in hexagonal lattice with the pitch (P) also equal to 320 mkm.

With regard to conventional lenses L1 and L2, it could be noted that each of these lenses has one aspherical surface and one flat surface. More specifically, the value of K on the Surface 5 was K=−0.91, and value of K on the Surface 7 was equal to K=−3.45.

The microlens arrays 36 and 38 were produced from a well known glass material BK7 of Corning Glass Co., Midland, USA. The lenses of the component 32 were made from polymer NOA 61 (the product of Norland Products, Inc., New Jersey, USA.

The system as a whole had the following general characteristics: f'/D ratio=2.8; f'=1.95; $f_b$ (working distance) =1.43.

Figure 4B:
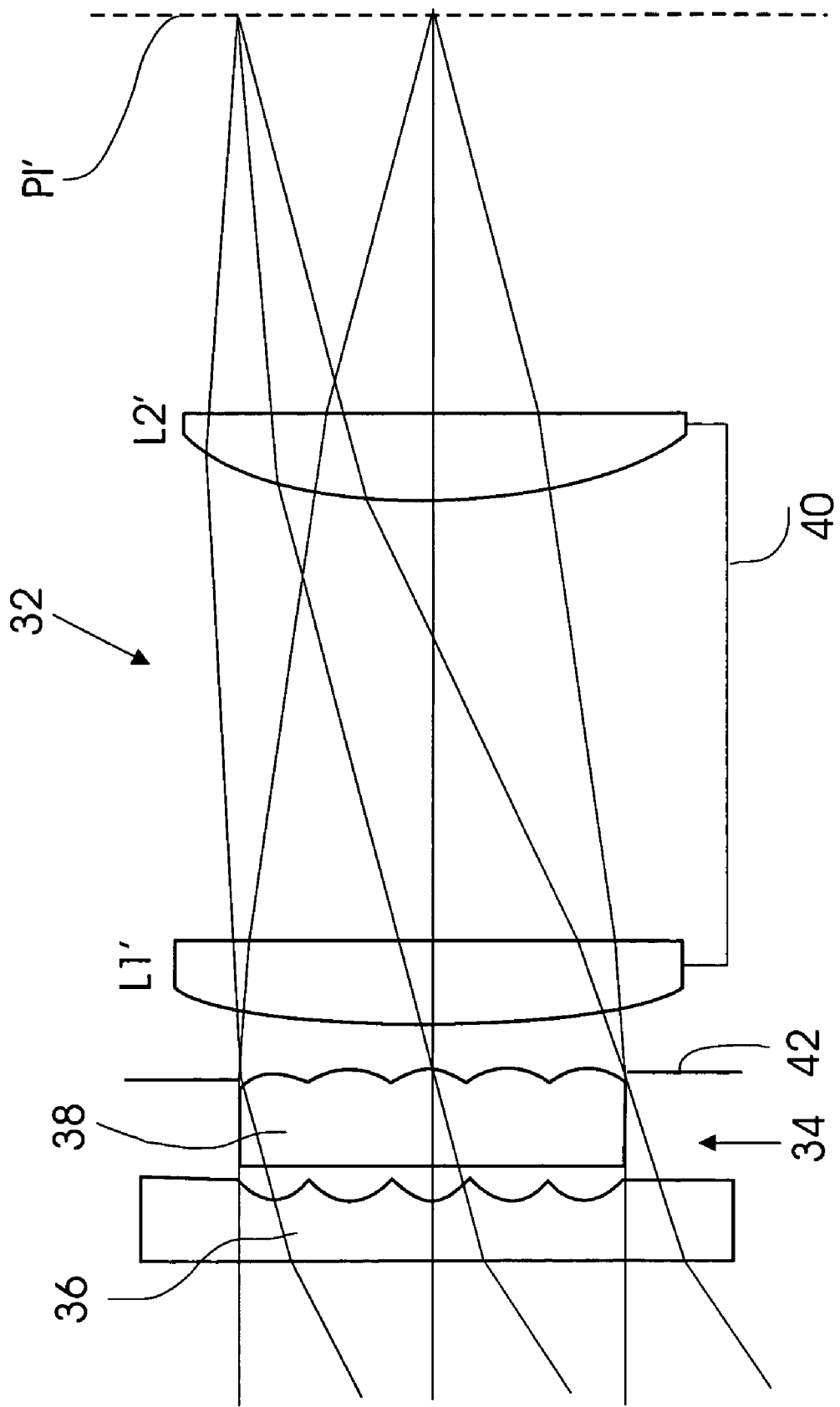
FIG. 4B is a view that shows optical ray traces for the system of FIG. 4A.

The optical ray traces for the system of FIG. 4A are shown in FIG. 4B. In FIG. 4B, the symbol PI' designates an image plane. In FIG. 4A, reference numeral 37 designates spaces between the back flat side 38' of the microlens array 38 and the curvilinear surface 36' of the microlens array 36 that are filled with gas, e.g., with air.

Figure 5:
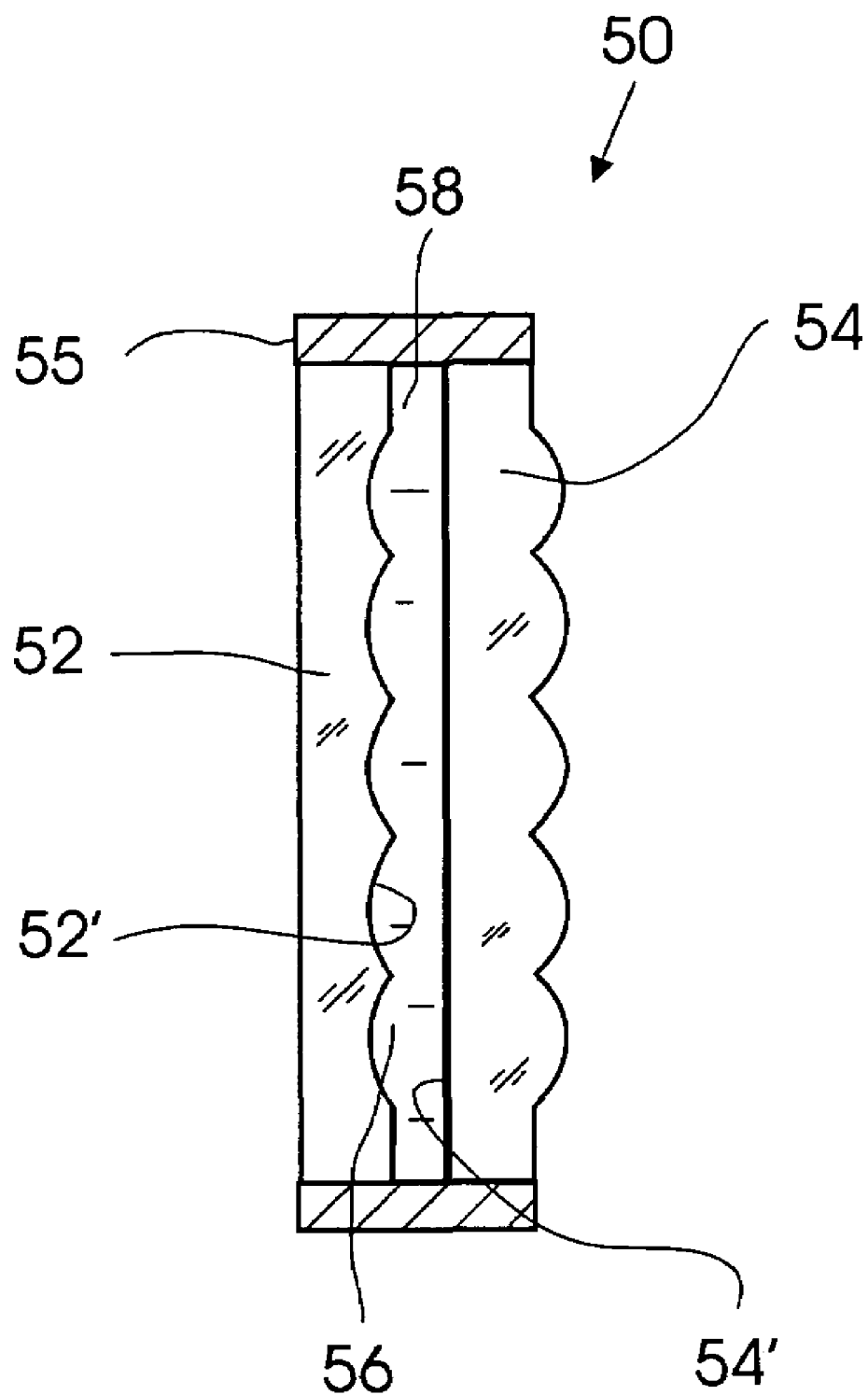
FIG. 5 is a schematic sectional view of a sealed microlens array assembly wherein the space between the microlens arrays is filled with an optical gel.

FIG. 5 is a schematic sectional view of a microlens array assembly of the first component in accordance with a third embodiment of the invention. This first component as a whole is designated by reference numeral 50 and in general is the same as similar components of the previous embodiments with the difference that this component 50 is sealed or encapsulated with a seal 55 and that the space between the back flat side 54' of the microlens array 54 and the curvilinear surface 52' of the microlens array 52 is filled with an optical medium, e.g., an optical gel that may have a refractive index different from that of the material of the microlens arrays 52 and 54. The filling with the optical gel makes it possible to control the optical characteristics of the lens system of objectives of the invention.

Thus, it has been shown that the invention provides a wide-angle lens system composed of a combination of a microlens array package with traditional lenses that makes it possible to significantly reduce overall dimensions of the lens system, reduce the weight of the lens system, suppress aberration, and create a compact flat high-performance objective with a wide range of application, e.g., for creation of photo images. The invention provide such a system of micro arrays that can be used in conjunction with conventional lens systems and can convert such system into compact wide-angle objectives without introduction of additional optical aberration effects.

Although the flat wide-angle lens system of invention has been described in detail with reference to specific embodiments and drawings, it is understood that these embodiments do not limit the field of application of the invention and that any changes and modifications are possible, provided they do not go beyond the scope of the patent claims. For example, the number of lenses in the second component may be different from those describe and shown in this specification. The dimensions, pitch, sag, and other characteristics of microlenses in microlens assemblies can vary in a wide range. The microlenses and lenses of the second component may be coated with anti-reflective coatings. The lens systems or objective of the present invention may be designed and calculate for use with lights in invisible wavelength ranges, e.g., in the UV and IR ranges. In the UV case, the lens arrays and conventional lenses can be made from UV-grade quartz and special glasses, magnesium fluoride, potassium fluoride, etc. In the case of IR, the lens arrays and conventional lenses can be made from material with high refractive indices, e.g., from germanium, etc. Although the microlens telescopes were shown for the case of an inverted Galileo microtelescope, the principle of the invention will not be violated if the coaxial microlenses form a microtelescope of Kepler.

The invention claimed is:

1. A flat wide-angle lens system for imaging an object comprising:
   a first component that comprises an assembly of microlenses; and
   a second component that comprises at least two conventional lenses; and
   an image plane on which an image of said object is to be reproduced by beams of light passing through said flat wide-angle lens system;
   said assembly of microlenses having an inlet side that during operation of said system faces an object, an inlet field angle of light incidence onto said inlet side a first-component outlet side that during the operation faces said second component, and an outlet field angle of light going out from said outlet side towards said second component, said first component converting said inlet field angle into said outlet field angle, which is smaller than said inlet field angle;
   said second component having a second-component outlet side from which said beam of light is focused onto said image plane for forming said image.

2. The system of claim 1, wherein assembly of microlenses comprises an assembly of a first microlens array comprising a plurality of microlenses of a first type and a second microlens array comprising a plurality of microlenses of a second type, said second microlens array being superimposed onto said first microlens array so that said microlenses of the first type are arranged coaxially with said microlenses of the second type.

3. The system of claim 2, wherein each pair of coaxial microlenses of said first type and of said second type form an inverted Galileo microtelescope.

4. The system of claim 2, wherein said system has an optical axis, each of said microlenses of the first type comprises a negative microlens having a flat side facing said inlet side and a concave side facing said outlet side and wherein each of said microlenses of the second type comprises a positive microlens having a flat side facing said inlet side and a convex side facing said outlet side; when viewed in a direction of said optical axis, said microlenses of the first type and microlenses of the second type being arranged into a pattern selected from the group consisting of a hexagonal lattice arrangement and an orthogonal lattice arrangement.

5. The system of claim 4, wherein each pair of coaxial microlenses of said first type and of said second type form an inverted Galileo microtelescope.

6. The system of claim 4, further provided with a space between said convex side of said microlens of said first type and a flat side of said microlens of said second type.

7. The system of claim 6, wherein each pair of coaxial microlenses of said first type and of said second type form an inverted Galileo microtelescope.

8. The system of claim 6, wherein said space is filled with a medium selected from gas and an optical gel.

9. The system of claim 8, wherein each pair of coaxial microlenses of said first type and of said second type form an inverted Galileo microtelescope.

10. The system of claim 1, wherein said second component comprises two conventional lenses with aspherical surfaces.

11. The system of claim 10, wherein assembly of microlenses comprises an assembly of a first microlens array comprising a plurality of microlenses of a first type and a second microlens array comprising a plurality of microlenses of a second type, said second microlens array being superimposed onto said first microlens array so that said microlenses of the first type are arranged coaxially with said microlenses of the second type.

12. The system of claim 11, wherein each pair of coaxial microlenses of said first type and of said second type form an inverted Galileo microtelescope.

13. The system of claim 11, wherein said system has an optical axis, each of said microlenses of the first type comprises a negative microlens having a flat side facing said inlet side and a concave side facing said outlet side and wherein each of said microlenses of the second type comprises a positive microlens having a flat side facing said inlet side and a convex side facing said outlet side; when viewed in a direction of said optical axis, said microlenses of the first type and microlenses of the second type being arranged into a pattern selected from the group consisting of a hexagonal lattice arrangement and an orthogonal lattice arrangement.

14. The system of claim 13, wherein each pair of coaxial microlenses of said first type and of said second type form an inverted Galileo microtelescope.

15. The system of claim 13, further provided with a space between said convex side of said microlens of said first type and a flat side of said microlens of said second type.

16. The system of claim 15, wherein each pair of coaxial microlenses of said first type and of said second type form an inverted Galileo microtelescope.

17. The system of FIG. 15, wherein said space is filled with a medium selected from gas and an optical gel.

18. The system of claim 17, wherein each pair of coaxial microlenses of said first type and of said second type form an inverted Galileo microtelescope.

19. The system of claim 1, wherein said second component comprises four spherical conventional lenses.

20. The system of claim 19, wherein assembly of microlenses comprises an assembly of a first microlens array comprising a plurality of microlenses of a first type and a second microlens array comprising a plurality of microlenses of a second type, said second microlens array being superimposed onto said first microlens array so that said microlenses of the first type are arranged coaxially with said microlenses of the second type.

21. The system of claim 20, wherein each pair of coaxial microlenses of said first type and of said second type form an inverted Galileo microtelescope.

22. The system of claim 20, wherein said system has an optical axis, each of said microlenses of the first type comprises a negative microlens having a flat side facing said inlet side and a concave side facing said outlet side and wherein each of said microlenses of the second type comprises a positive microlens having a flat side facing said inlet side and a convex side facing said outlet side; when viewed in a direction of said optical axis, said microlenses of the first type and microlenses of the second type being arranged into a pattern selected from the group consisting of a hexagonal lattice arrangement and an orthogonal lattice arrangement.

23. The system of claim 22, wherein each pair of coaxial microlenses of said first type and of said second type form an inverted Galileo microtelescope.

24. The system of claim 22, further provided with a space between said convex side of said microlens of said first type and a flat side of said microlens of said second type.

25. The system of claim 24, wherein each pair of coaxial microlenses of said first type and of said second type form an inverted Galileo microtelescope.

26. The system of claim 24, wherein said space is filled with a medium selected from gas and an optical gel.

27. The system of claim 26, wherein each pair of coaxial microlenses of said first type and of said second type form an inverted Galileo microtelescope.

* * * * *